(12) United States Patent
Ivanak et al.

(10) Patent No.: US 11,171,527 B2
(45) Date of Patent: Nov. 9, 2021

(54) ELECTRIC DRIVE MOTOR HAVING PERMANENT MAGNETS PUSHED RADIALLY OUTWARDLY BY A TENSIONING DEVICE

(71) Applicant: BSH HAUSGERAETE GMBH, Munich (DE)

(72) Inventors: Martin Ivanak, Kosice (SK); Michal Kalavsky, Kosice (SK)

(73) Assignee: BSH Hausgeraete GmbH, Munich (DE)

( * ) Notice: Subject to any disclaimer, the term of this patent is extended or adjusted under 35 U.S.C. 154(b) by 127 days.

(21) Appl. No.: 16/341,934

(22) PCT Filed: Oct. 4, 2017

(86) PCT No.: PCT/EP2017/075180
§ 371 (c)(1),
(2) Date: Apr. 15, 2019

(87) PCT Pub. No.: WO2018/069104
PCT Pub. Date: Apr. 19, 2018

(65) Prior Publication Data
US 2019/0245397 A1    Aug. 8, 2019

(30) Foreign Application Priority Data

Oct. 13, 2016 (DE) ...................... 10 2016 219 974.9

(51) Int. Cl.
*H02K 1/28* (2006.01)
*H02K 15/03* (2006.01)
(Continued)

(52) U.S. Cl.
CPC ............. *H02K 1/278* (2013.01); *F04B 17/03* (2013.01); *H02K 1/30* (2013.01); *H02K 15/03* (2013.01)

(58) Field of Classification Search
CPC ............ H02K 1/278; H02K 1/28; H02K 1/30; H02K 15/03; H02K 15/02; H02K 15/10; H02K 15/12; H02K 15/14; F04B 17/03
(Continued)

(56) References Cited

U.S. PATENT DOCUMENTS 6,836,954 B1   1/2005   Carli et al.
9,812,914 B2   11/2017  Kawai et al.
(Continued)

FOREIGN PATENT DOCUMENTS

CN   100379122 C   4/2008
CN   102792570 A   11/2012
(Continued)

*Primary Examiner* — Michael Andrews
(74) *Attorney, Agent, or Firm* — Laurence A. Greenberg; Werner H. Stemer; Ralph E. Locher

(57) ABSTRACT

An electric drive motor includes a stator with pole shoes and at least one electrically actuable stator winding, a permanent-magnet rotor mounted in a rotationally driveable manner in the field of the stator winding defining an annular gap therebetween, a motor shaft, a magnet carrier disposed on the motor shaft and being produced in one piece as an injection-molded part, and a plurality of separate permanent magnets disposed on and distributed over the circumference of the magnet carrier. The permanent magnet rotor has a tensioning or clamping device for pressing the plurality of permanent magnets outwards in radial directions towards against an inner wall of a cavity in an injection mold of the magnet carrier during injection molding of the magnet carrier. A domestic appliance having the electric drive motor is also provided.

13 Claims, 7 Drawing Sheets

(51) Int. Cl.
*H02K 1/27* (2006.01)
*H02K 1/30* (2006.01)
*F04B 17/03* (2006.01)

(58) Field of Classification Search
USPC ............ 310/156.55, 156.12, 156.16, 156.19, 310/261.1
See application file for complete search history.

(56) References Cited

U.S. PATENT DOCUMENTS

| | | | |
|---|---|---|---|
| 10,224,772 B2 | 3/2019 | Siebald | |
| 10,554,083 B2 | 2/2020 | Lambers | |
| 2004/0233576 A1* | 11/2004 | Khan | F16C 33/12 360/99.08 |
| 2012/0313463 A1* | 12/2012 | Howell | H02K 15/03 310/43 |
| 2015/0379897 A1* | 12/2015 | Nadig | H02K 1/30 310/1 |
| 2016/0020008 A1* | 1/2016 | Powell | H02K 1/2786 310/156.01 |

FOREIGN PATENT DOCUMENTS

| | | |
|---|---|---|
| CN | 204376564 U | 6/2015 |
| CN | 104798289 A | 7/2015 |
| CN | 205160235 U | 4/2016 |
| CN | 105896770 A | 8/2016 |
| DE | 102012221422 A1 | 5/2014 |
| DE | 102015014628 A1 | 5/2016 |
| WO | 9938242 A1 | 7/1999 |
| WO | 2011090394 A1 | 7/2011 |

* cited by examiner

ELECTRIC DRIVE MOTOR HAVING PERMANENT MAGNETS PUSHED RADIALLY OUTWARDLY BY A TENSIONING DEVICE

BACKGROUND OF THE INVENTION

Field of the Invention

The invention relates to an electric drive motor having a stator with pole shoes and at least one electrically actuatable stator winding, and having a permanent-magnet motor which is mounted in a rotatably drivable manner in a field of the stator winding such that an annular gap is left and which has a motor shaft and a magnet carrier which sits on the motor shaft and is produced in one piece as an injection-molded part, a plurality of separate permanent magnets being arranged on said magnet carrier in a manner distributed over the circumference. The invention also relates to a household appliance having an electric drive motor of this kind.

EP 2 908 4407 A2 describes an electric drive motor for a pump, having an electrically actuatable stator winding and a rotor which is mounted in a rotatably drivable manner in a field of the stator winding such that an annular gap is left and which has a motor shaft and a magnet carrier which sits on the motor shaft and a plurality of permanent magnets arranged distributed about at least one outer surface of the magnet carrier, which each have at least one outer surface and are fastened to the magnet carrier by means of a plastic body injection molded around the magnet carrier, wherein the permanent magnets are held on their outer surfaces facing towards the annular gap by the plastic body with a form fit and/or force fit in such a way that at least a part of these outer surfaces is left free.

SUMMARY OF THE INVENTION

The object of the invention is to create an electric drive motor of which the permanent magnet rotor is improved.

The object of the invention is achieved by an electric drive motor having a stator with pole shoes and at least one electrically actuatable stator winding, and having a permanent-magnet rotor which is mounted in a rotatably drivable manner in a field of the stator winding such that an annular gap is left and which has a motor shaft and a magnet carrier which sits on the motor shaft and is produced in one piece as an injection-molded part, a plurality of separate permanent magnets being arranged on said magnet carrier in a manner distributed over the circumference, wherein the permanent-magnet rotor has a tensioning device, for pushing the plurality of permanent magnets in radial directions outwards against an inner wall of a cavity of an injection mold of the magnet carrier during the injection molding of the magnet carrier.

The electric drive motor can in particular have a fixed outer stator and a rotatably mounted inner rotor. The permanent-magnet rotor has a plurality of poles, in particular four, six, eight ten or twelve poles. Each permanent magnet of the permanent magnet rotor can be arranged separately in the magnet carrier and in particular can be fixed therein to stop it slipping or falling out. The magnet carrier can in particular be produced by the individual permanent magnets and the motor shaft being inserted into an injection mold, being positioned in the correct location therein and having a plastic material, in particular a thermoplast, injection molded around them. The magnet carrier is therefore produced in this form of embodiment by the injected and hardened plastic mass. The shape of the magnet carrier is predetermined by the form of the cavity in the injection mold.

Generally all permanent magnets of the permanent-magnet rotor are preferably embodied identically. Each permanent magnet can in particular have a circle sector shape. The permanent magnets can be arranged distributed evenly over the circumference of the permanent-magnet rotor. Therefore permanent magnets arranged evenly distributed over the circumference of the permanent-magnet rotor, apart from small gaps, can be expanded into a circumferential magnet ring composed of a plurality of pieces. Each permanent magnet considered in isolation is preferably embodied in one piece. The permanent magnets can in particular be produced from hard-magnetic ferrites.

Usually a plurality of individual permanent magnets corresponding to the plurality of poles of the plurality of pole pairs will be used on permanent-magnet rotors, wherein each permanent magnet has precisely one single north pole and one single south pole. As an alternative, permanent-magnet rotors can also have a plurality of circle sector-shaped permanent magnets, which are magnetized with more than one single north pole and one single south pole. In this way the permanent magnets can each have two north poles and two south poles for example.

The permanent-magnet rotor can however also have a plurality of permanent magnets for example, of which each permanent magnet, on its convex magnet outer surface, has at least one single magnetic south pole and at least one single magnetic north pole. Each permanent magnet can in principle however also have two or more magnetic south poles. Each permanent magnet can then accordingly also have two or more magnetic north poles. In particular each permanent magnet, on its convex magnet outer surface, can however have precisely one single magnetic south pole and precisely one single magnetic north pole. On the end-face side of the permanent magnet pointing in the circumferential direction situated closer to the magnetic south pole said permanent magnet has a magnetic north pole, which forms the opposite pole to the magnetic south pole of the convex magnet outer surface. In the same sense the permanent magnet, on the opposite end-face side situated closer to the magnetic north pole of the convex magnet outer surface, has a magnetic south pole, which forms the opposite pole to the magnetic north pole of the convex magnet outer surface.

The fact that the permanent-magnet rotor has a tensioning device, which is embodied to push the plurality of permanent magnets in radial directions outwards against an inner wall of a cavity of an injection mold of the magnet carrier during the injection molding of the magnet carrier on the one hand enables a permanent-magnet rotor with a very high positional accuracy of the permanent magnets to be produced and on the other hand enables an electric drive motor to be produced very effectively, since on the one hand the tensioning device no longer has to be removed after the injection molding and on the other the tensioning device remaining in the permanent-magnet rotor even after the injection molding process can fulfill another function during the operation of the electric drive motor, namely the formation of a magnetic yoke providing a return path for the magnetic fields of the plurality of permanent magnets.

Accordingly the tensioning device can form a magnetic yoke providing a return path for the magnetic fields of the plurality of permanent magnets.

The tensioning device can in particular bring about a very high positional accuracy of the permanent magnets through the fact that the tensioning device pushes all of the permanent magnets present in the cavity of the injection mold against the inner wall of the cavity of the injection mold and holds them there. It is thus insured that all magnet outer surfaces of the permanent magnets lie on precisely the same circumference and do not have a rotated or tilted position in relation to this predetermined circular cylindrical surface. Thus a permanent-magnet rotor is obtained with a magnet carrier obtained by injection molding, in which the individual permanent magnets are uniquely defined by the injection molding in their respective positions and locations and are fastened by the melted plastic material. Thus, through this process, the permanent magnets have especially positionally accurate positions and orientations relative to the motor shaft, which leads to an especially even magnetic field and to a good balance of the permanent-magnet rotor. On the other hand the especially accurate position of the magnetic outer surfaces of the permanent magnets enables an especially accurately-shaped and in particular very narrow annular gap between the permanent-magnet rotor and the stator of the electric drive motor to be realized, which can improve the efficiency of the electric drive motor. In this case the magnet outer surfaces of the permanent magnets can be at least largely or even completely free of injection material of the magnet carrier and can delimit the annular gap directly, i.e. the annular gap is formed on the inner circumferential side by the outer curved surface walls of the permanent magnets. In the case of a wet running motor the electric drive motor can be embodied so that a fluid, such as water or a washing liquor of a dishwasher for example, flows through the annular gap. In such a case the magnet outer surfaces of the permanent magnets are wetted directly by the fluid, such as water or a washing liquor of a dishwasher for example.

The tensioning device can have at least two part shells that, when placed against one another in the circumferential direction, make up a two-part or multi-part annular body, which forms an outer curved surface wall, against which the plurality of permanent magnets lie flush.

The permanent magnets in this case lie with their magnet inner surfaces directly against the outer surface of the annular body formed by the part shells. The outer curved surface wall of the annular body therefore predetermines the precise positions and locations of all permanent magnets. The tensioning device itself can have elastic properties, to enable it to push the plurality of permanent magnets in radial directions outwards against the inner wall of the cavity of the injection mold of the magnet carrier during the injection molding of the magnet carrier.

In order to push the plurality of permanent magnets in radial directions outwards against the inner wall of the cavity of the injection mold of the magnet carrier during the injection molding of the magnet carrier, as an alternative or in addition, the at least two part shells can be embodied axially adjustable in relation to one another, in such a way that, during an axial adjustment, at least one of the at least two part shells, all part shells are moved outwards in radial directions and through this the plurality of permanent magnets can be pushed in radial directions outwards against the inner wall of the cavity of the injection mold of the magnet carrier.

The fact that the at least two part shells are embodied so that they are axially adjustable in relation to one another enables an especially simple and space-saving tensioning device to be created. During such an axial adjustment of at least one of the at least two part shells all part shells, all part shells are moved outwards in radial directions, so that the permanent magnets can be pushed outwards in radial directions against the inner wall of the cavity of the injection mold of the magnet carrier.

For this purpose the tensioning device can have adjusting wedges. In this case at least two adjusting elements can each have an angled surface, wherein the two angled surfaces lie against one another. If one adjusting element is now displaced, the other adjustment element, as a result of the two angled surfaces lying against one another, is moved at a right angle thereto. The adjusting elements can be formed by the part shells themselves. The angled surfaces can be formed by end-face walls of the part shells pointing in the circumferential direction.

Accordingly each part shell can have a basic shape extending in a circle arc shape about an axial symmetry line, with a circle sector-shaped, convex outer curved surface wall, a circle sector-shaped, concave inner curved surface wall and a first end face wall pointing in the circumferential direction in the direction of rotation of the permanent-magnet rotor, as well as a second end face wall pointing in the circumferential direction against the direction of rotation of the permanent-magnet rotor, wherein the first end face wall and the second end face wall each lie in a plane that is arranged in the direction of the axial line of symmetry that forms the axis of rotation of the permanent-magnet rotor, by a rotated angle running slanted at a right angle to the axial symmetry line.

Expressed in different terms, the first end face wall is thus beveled in relation to the axial direction. The second end face wall is also beveled in relation to the axial direction. The first end face wall of a part shell in each case lies flat against the second end face wall of the other part shell. If the first part shell is now adjusted in the axial direction with regard to the other part shell, the two end face walls of adjacent part shells pointing in the circumferential direction move, so that therefore the diameter of the adjoining part shells complementing each other to form an annular body expands. Through the expansion of the diameter of the annular body composed of the part shells the permanent magnets are pushed in radial directions outwards during the injection molding of the magnet carrier against the inner wall of the cavity of the injection mold of the magnet carrier.

The angle can preferably amount to between 1 degree and 20 degrees, in particular at least essentially 12 degrees.

The tensioning device or each part shell can be produced from a ferritic chromium steel. The ferritic chromium steel can in particular be a chromium steel of the kind X6Cr17 (AISI 430).

Each permanent magnet can have a convex magnet outer surface facing radially outwards and an opposite concave magnet inner surface facing radially inwards, against which the tensioning device or the part shells rest flush with their outer curved surface walls.

In the case of a total of three one-piece permanent magnets, there can be a grouping of a plurality of permanent magnets by three permanent magnets, which each have an arc length running over 120 degrees being grouped together to form an overall circular ring running over 360 degrees. In the case of a total of four one-piece permanent magnets there can be a grouping by four permanent magnets, which each have an arc length running over 90 degrees being grouped together to form an overall circular ring running over 360 degrees. In the case of a total of five one-piece permanent magnets, there can be a grouping by five permanent magnets, which each have an arc length running over 72 degrees being grouped together to form an overall circular ring running over 360 degrees, etc. There can be slight deviations from these angular values within the framework of the invention, for example intentionally to leave a slight gap between the end face sides of two neighboring permanent magnets. Leaving a gap between the end face sides of two neighboring permanent magnets can be sensible to be able to compensate for tolerances caused by manufacturing in the dimensions of the individual permanent magnets or for example to have play provided by the gaps so that the individual permanent magnets can adapt to changes in temperature during operation, without stresses occurring in the permanent magnets.

The convex magnet surface facing radially outwards and the concave magnet inner surface facing radially inwards can each be a circular cylindrical surface wall of the permanent magnets. The convex magnet surface facing radially outwards and the concave magnet inner surface facing radially inwards can be arranged aligned in parallel to one another by a distance and thus form circular ring sector-shaped permanent magnets of constant wall thickness.

Each permanent magnet can be produced from a pressed and subsequently sintered magnetic powder, which is subjected to a magnetization field during the manufacturing of the permanent magnet, at which the magnetic field lines leaving the magnetic north pole at the convex magnet outer surface of the permanent magnet to be magnetized and/or the magnetic field lines entering the magnetic south pole at the convex magnet outer surface of the permanent magnet to be magnetized are each concentrated in a virtual focus, which lies on a magnetization radius outside the outer contour radius of the convex magnet outer surface of the permanent magnet.

If the permanent magnets are produced from a pressed and subsequently sintered magnetic powder, it is especially expedient that each individual, one-piece permanent magnet has an arc length that runs at less than 180 degrees, i.e. preferably at 120 degrees, 90 degrees, 72 degrees or less. This insures that sufficiently high pressing force can be introduced into the magnetic powder at all points of the permanent magnet during a pressing process.

Each permanent magnet can have a convex magnet outer surface facing radially outwards, which forms at least a part of the curved surface wall of the permanent-magnet rotor, which directly delimits the annular gap of the drive motor from the inside.

The especially precise location of the magnet outer surfaces of the permanent magnets created by means of the inventive solutions enables an especially accurately shaped and in particular very narrow annular gap between the permanent-magnet rotor and the stator of the electric drive motor to be realized, which can improve the efficiency of the electric drive motor. In this case the magnet outer surfaces of the permanent magnets can be free from injection material of the magnet carrier and can delimit the annular gap directly, i.e. the annular gap is formed on the inner circumferential side by the outer curved surface walls of the permanent magnets. In the case of the wet running motor the electric drive motor can be embodied so that a fluid, for example water or a washing liquor of a dishwasher, flows through the annular gap. In such a case the magnet outer surfaces of the permanent magnets are wetted directly by the fluid, such as water or a washing liquor of a dishwasher for example.

Each permanent magnet, in all embodiment variants described, can have a longitudinal groove extending in the axial direction on its respective convex magnet outer surface.

The longitudinal groove extending in the axial direction can therefore divide the respective convex magnet surface of a permanent magnet into two equal-sized part surfaces. One of two magnetic poles of the convex magnet outer surface can be arranged on each of these two part surfaces. The groove can therefore run along between the two magnetic poles of the convex magnet outer surface and separate the one magnetic pole of the convex magnet outer surface from the other magnetic pole of the convex magnet surface.

The longitudinal groove extending in the axial direction can in general, i.e. regardless of the type of magnetization of the permanent magnets, have another or an alternate function. Thus the groove can form a channel into which the plasticized plastic mass can flow during the manufacture of the magnet carrier, when the permanent magnet and the motor shaft are inserted into an injection mold in order to manufacture the magnet carrier by injection molding. The permanent magnets and the motor shaft are enclosed in this case in the plastic mass and the magnet carrier is formed. In the hardened state of the plastic mass webs made of plastic are consequently formed in the grooves, which, during operation of the drive motor, mechanically support the permanent magnets against the centrifugal force acting on the permanent magnets resulting from the rotation of the permanent-magnet rotor and thus hold the permanent magnets at their circumference.

In general one or more edges of each permanent magnet can be provided with a chamfer.

The chamfers can be present on individual edges, on a plurality of edges or on all edges of the respective permanent magnet. Each chamfer can be present preferably on the right-angled edges of the permanent magnet. Each chamfer can in particular be formed by an angle set at 45 degrees to one of the adjoining surfaces of the edge. The chamfers can in particular be introduced even at the production stage of the permanent magnets by pressing and sintering magnetic powder. In particular they do not have to be only made afterwards by grinding or chamfering the right-angled edges of the permanent magnet.

The object is also achieved by a household appliance, in particular a dishwasher, a washing machine, a dryer, an extractor hood or a household appliance pump, in particular as a component of one of the said household appliances, having an electric drive motor in accordance with one or more of the forms of embodiment described and/or illustrated.

Concrete forms of embodiment of inventive components of electric drive motors are explained in greater detail in the description below, which refers to the enclosed figures. Specific individual features of these exemplary embodiments, regardless of the actual context in which they are mentioned, can if necessary also represent general features of the invention considered individually or in combinations other than those presented.

DESCRIPTION OF THE INVENTION

Figure 1:
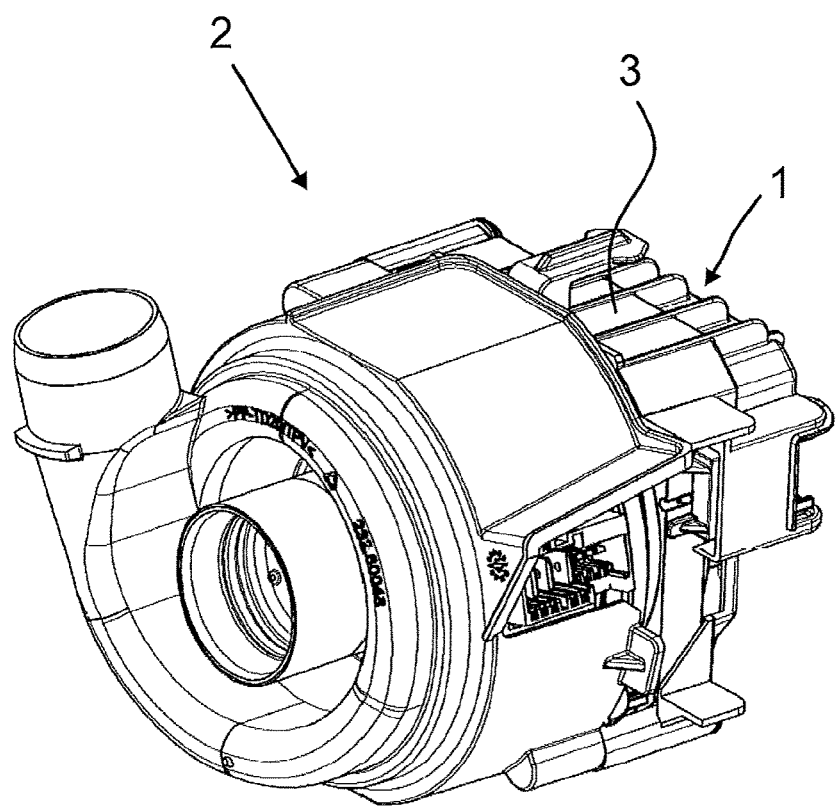
FIG. 1 shows a perspective diagram of an example of a household appliance pump of a dishwasher, which has an electric drive motor.
Figure 2:
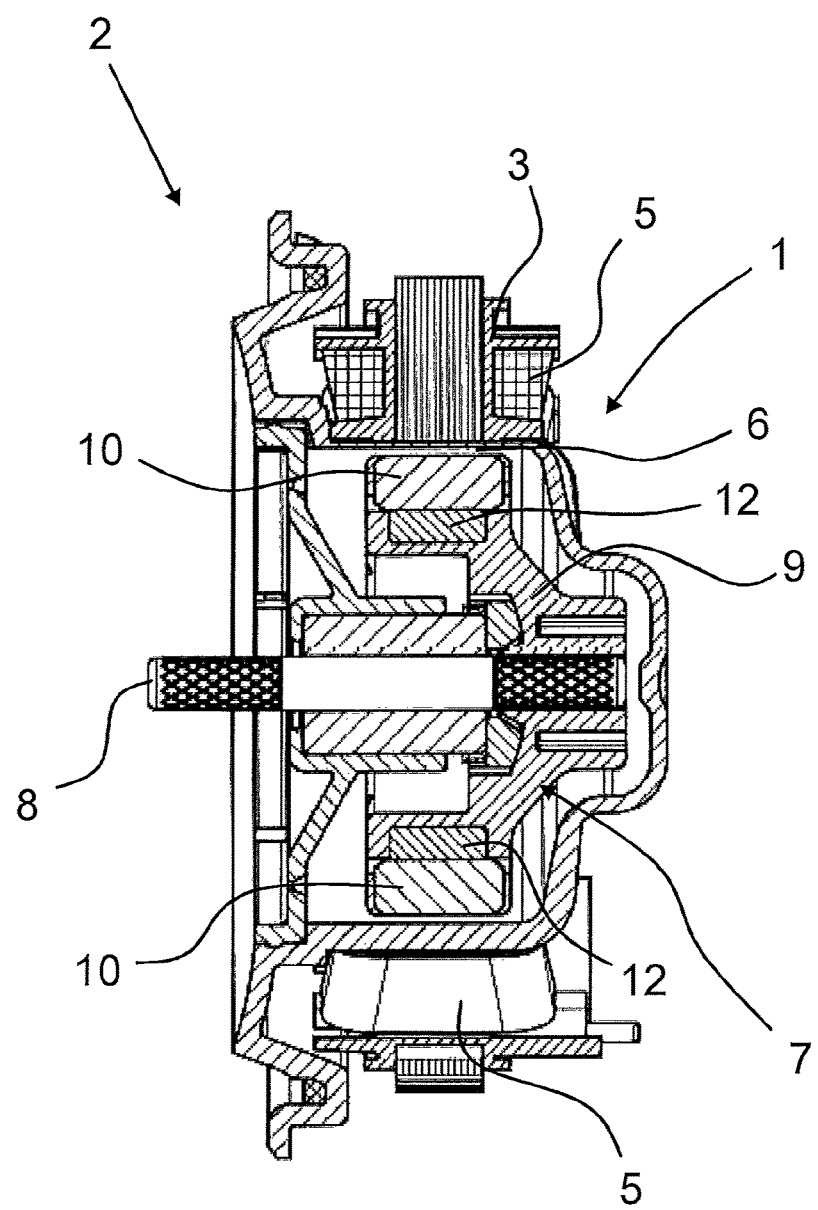
FIG. 2 shows a cross-sectional diagram of the household appliance pump depicted in FIG. 1 and of the electric drive motor.

FIG. 1 to FIG. 7 show components of an example of an electric drive motor 1 of a household appliance pump 2, as shown especially in FIG. 1 and FIG. 2, of a example of a dishwasher, having a stator 3 with pole shoes and at least one electrically actuatable stator winding 5, and a permanent-magnet rotor 7, which is mounted in a rotationally drivable manner in the field of the stator winding 5 such that an annular gap 6 is left.

The permanent-magnet rotor 7 has a motor shaft 8 and a magnet carrier 9, which sits on the motor shaft and is produced in one piece as an injection-molded part, on which a plurality of separate permanent magnets 10 are arranged distributed over a circumference.

Figure 4:
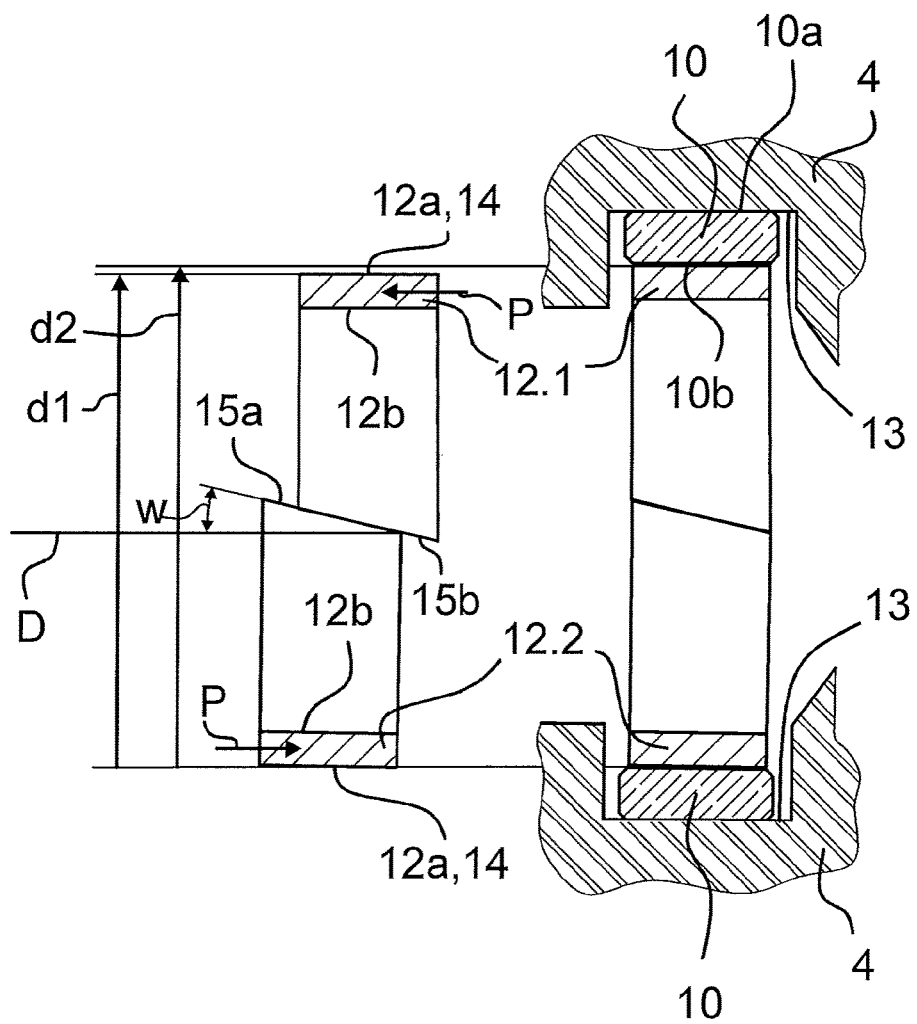
FIG. 4 shows a schematic cross-sectional diagram of the permanent magnets inserted into the cavity of the injection mold, in which the tensioning device is formed from two part shells (half shells)

The magnet carrier 9 is produced in particular by the individual permanent magnets 10 and the motor shaft 8 being inserted into an injection mold 4, as is shown for example in FIG. 4, positioned in the correct location therein and having a plastic material, in particular a thermoplast, molded around them. The magnet carrier 9 is therefore produced in such forms of embodiment by the injected and hardened plastic mass. The shape of the magnet carrier 9 is predetermined in this case by the form of the cavity in the injection mold 4.

In the case of the present example the permanent-magnet rotor 7 has a tensioning device 12, which is embodied to push the plurality of permanent magnets 10 in radial directions outwards against an inner wall 13 (FIG. 4) of a cavity of the injection mold 4 of the magnet carrier 9 during the injection molding of the magnet carrier 9.

The tensioning device 12, in the case of the present exemplary embodiment, has precisely two part shells 12.1 and 12.2, which thus form two half shells and which, placed against one another in the circumferential direction, complement each other to form a two-part annular body, which forms an outer curved surface wall 14, against which the plurality of permanent magnets 10 rest flush, as is shown in particular in FIG. 4.

The effect of the tensioning device 12 in particular by a very high positional accuracy of the permanent magnets 10, is that the tensioning device 12 pushes all permanent magnets 10 present in the cavity of the injection mold 4 against the inner wall 13 of the cavity of the injection mold and holds them there. In this way it is insured that all magnet outer surfaces 10a of the permanent magnets 10 lie on precisely the same circumference and do not have a twisted or tilted location in relation to this predetermined circular cylinder surface of the cavity. In this way a permanent-magnet rotor 7 is obtained with a magnet carrier 9 obtained by injection molding, in which the individual permanent magnets 10 are uniquely defined and fixed in their respective positions and locations by the molding-in. Thus through this the permanent magnets 10 have especially positionally-accurate positions and locations relative to the motor shaft 8, which leads to an especially good balancing of the permanent-magnet rotor 7. On the other hand the especially precise location of the magnet outer surfaces 10a of the permanent magnets 10 enables an especially precisely shaped and in particular very narrow annular gap 6 to be realized between the permanent-magnet rotor 7 and the stator 3 of the electric drive motor 1, which can improve the efficiency of the electric drive motor 1.

In this case the magnet outer surfaces 10a of the permanent magnets 10 are free from injection material of the magnet carrier 9 and directly delimit the annular gap 6, i.e. the annular gap 6 is formed on its inner circumferential side by the magnet outer surfaces 10a of the permanent magnets 10. In the case of a wet running motor the electric drive motor 1 can be embodied so that a fluid, such as water or a washing liquor of a dishwasher for example, flows through the annular gap 6. In such a case the magnet outer surfaces 10a of the permanent magnets 10 are wetted directly by the fluid, such as water or a washing liquor of a dishwasher for example.

Each part shell 12.1 and 12.2 has a basic shape extending in the shape of a circle arc about an axial line of symmetry, with a circle sector-shaped convex outer curved surface wall 12a, a circle sector-shaped concave inner curved surface wall 12b and a first end face wall 15a pointing in a circumferential direction in the direction of rotation of the permanent-magnet rotor 7, as well as a second end face wall 15b pointing in a circumferential direction against the direction of rotation of the permanent-magnet rotor 7, wherein the first end face wall 15a and the second end face wall 15b each lie in a plane, which in the direction of the line of axial symmetry, which forms the axis of rotation D of the permanent-magnet rotor 7, are arranged running at an angle by an angle W slanted at right angles to the line of axial symmetry (FIG. 4).

The tensioning device 12, i.e. the part shells 12.1 and 12.2 therefore, expressed in different terms, has adjusting wedges. In this case at least two adjusting wedges can each have one angled surface, wherein the two angled surfaces rest against one another. If an adjusting body is now shifted, the other adjusting body, because of the two angled surfaces resting against one another, is moved at a right angle thereto. The adjusting bodies, as in the case of the present exemplary embodiment, can be formed by the part shells 12.1 and 12.2 themselves. The angled surfaces can be formed by the end face walls 15a and 15b of the part shells 12.1 and 12.2 pointing in the circumferential direction.

The angle W lies between 1 degree and 20 degrees and, in the case of the present example, amounts to appr. 12 degrees.

The two part shells 12.1 and 12.2, as shown in FIG. 4, are embodied to be axially adjustable in relation to one another, in such a way that, with an axial adjustment, at least one of the two part shells 12.1 and 12.2 or both part shells 12.1 and 12.2 are moved outwards in radial directions and thereby the plurality of permanent magnets 10 are pushed in radial directions outwards against the inner wall 13 of the cavity of the injection mold 4 of the magnet carrier 9. Through the axial movement in relation to one another in arrow directions P the diameter of the annular body formed by the part shells 12.1 and 12.2 increases from a smaller diameter d1 to a slightly larger diameter d2.

Each permanent magnet 10 has a convex magnet outer surface 10a facing radially outwards and an opposite concave magnet inner surface 10b facing radially inwards (FIG. 6) against which the tensioning device 12, i.e. the part shells 12.1 and 12.2 rest flush with their outer curved surface walls 14 (FIG. 4).

Figure 5:
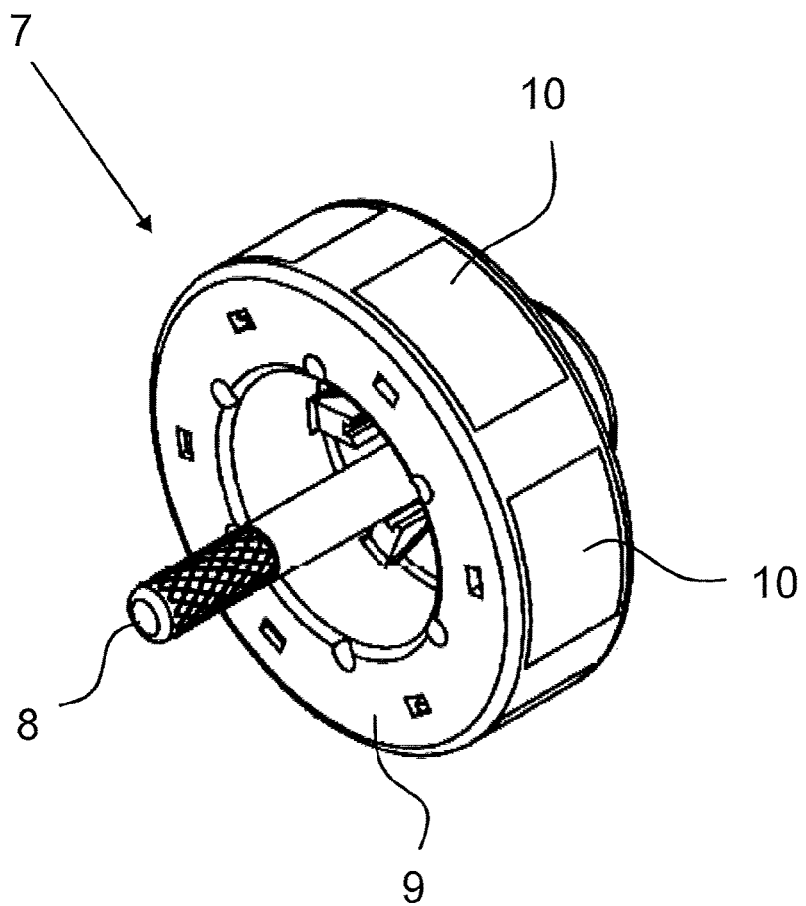
FIG. 5 shows a perspective diagram of the permanent-magnet rotor depicted in FIG. 3 in its assembled state.

Each permanent magnet 10 therefore has a convex magnet outer surface 10a facing radially outwards that, as shown in particular in FIG. 5, forms at least a part of the curved surface wall of the permanent-magnet rotor 7, which directly delimits the annular gap 6 of the drive motor 1 (FIG. 2) from inside.

The tensioning device 12 in this case moreover forms a magnetic yoke providing a return path for the magnetic fields of the plurality of permanent magnets 10.

Figure 3:
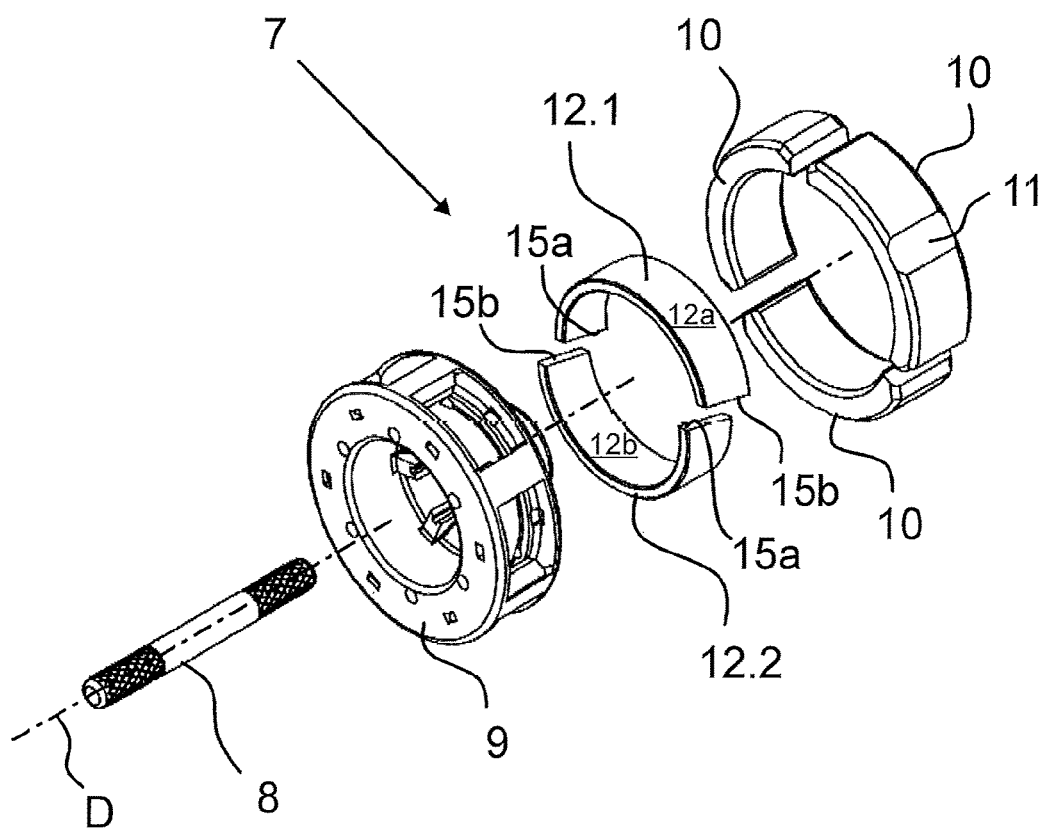
FIG. 3 shows an exploded diagram of an inventive permanent magnet motor of the electric drive motor depicted in FIG. 2.

The permanent-magnet rotor 7, as is shown in particular in FIG. 3 in an exploded diagram and in FIG. 4 in an assembled state, has a motor shaft 8 and a magnet carrier 9 sitting on the motor shaft 8, on which a plurality of permanent magnets 10 are arranged distributed over a circumference.

The permanent-magnet rotor 7, in the case of the present example, has precisely three permanent magnets 10, which are arranged on the magnet carrier 9 distributed over the circumference, offset by 120 degrees in relation to one another in each case, as is shown in particular in FIG. 3.

FIG. 3 also shows, how in the case of the present exemplary embodiment, each permanent magnet 10 has a longitudinal groove 11 extending in the axial direction on its respective convex magnet outer surface 10a.

Figure 6:
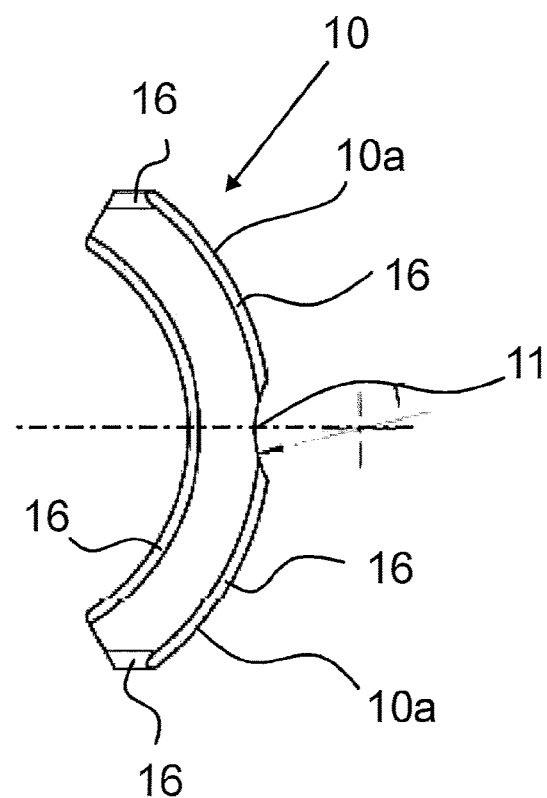
FIG. 6 shows an end face side overhead view of a typical permanent magnet.
Figure 7:
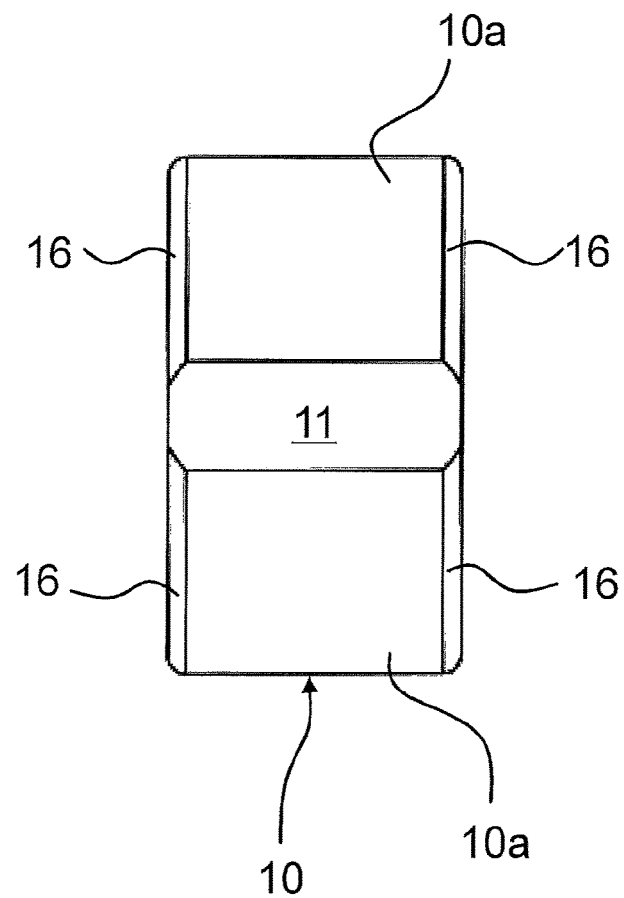
FIG. 7 shows a view of the convex magnet surface of an example of a permanent magnet.

What is more, as is shown in FIGS. 3, 6 and FIG. 7, the edges of each permanent magnet 10 are provided with chamfers 16.

The convex magnet outer surfaces 10a facing radially outwards and the concave magnet inner surfaces 10b facing radially inwards, in the case of the exemplary embodiment shown, each form a circular cylindrical surface wall of the permanent magnet 10. The convex magnet outer surface 10a facing radially outwards and the concave magnet inner surface 10b facing radially inwards can be arranged as shown at a distance aligned in parallel to one another and thus form circular ring sector-shaped permanent magnets 10 of constant wall thickness.

LIST OF REFERENCE CHARACTERS

1 Electric drive motor
2 Household appliance pump
3 Stator
4 Injection mold
5 Stator winding
6 Annular gap
7 Permanent-magnet rotor
8 Motor shaft
9 Magnet carrier
10 Permanent magnets
10a Convex magnet outer surface
10b Concave magnet inner surface
11 Groove
12 Tensioning device
12.1, 12.2 Part shells
12a Convex outer curved surface wall
12b Concave inner curved surface wall
13 Inner wall of a cavity
14 Outer curved surface wall
15a First end face wall
15b Second end face wall
16 Chamfers
D Axis of rotation

The invention claimed is:

1. An electric drive motor, comprising:
a stator having pole shoes and at least one electrically actuatable stator winding having a field;
a permanent-magnet rotor rotatably and drivably mounted in the field of said stator winding and defining an annular gap between said rotor and said stator, said rotor having a tensioning device;
a motor shaft;
an injection-molded magnet carrier disposed on said motor shaft, said magnet carrier having a circumference and an injection mold with a cavity defining an inner wall; and
a plurality of separate permanent magnets disposed on said magnet carrier and distributed over said circumference of said magnet carrier, said plurality of permanent magnets being pushed in radial directions outwardly against said inner wall by said tensioning device during injection molding of said magnet carrier;
said tensioning device including at least two part shells being assembled together in the circumferential direction and complementing each other to form a two-part or multi-part annular body forming an outwardly curved surface wall against which said plurality of permanent magnets rest flush;
said at least two part shells being adjusting wedges each having an angled surface resting against one another, at least one of said adjusting wedges configured to be axially shifted along said angled surfaces to increase a diameter of said tensioning device for pressing said plurality of permanent magnets outwards in radial directions against said inner wall of said cavity of said injection mold of said magnet carrier during an axial adjustment of at least one of said at least two part shells.

2. The electric drive motor according to claim 1, wherein said tensioning device forms a magnetic yoke providing a return path for magnetic fields of said plurality of permanent magnets.

3. The electric drive motor according to claim 1, wherein:
each said part shell has a basic shape extending in a circle arc shape about an axial symmetry line and including a circle sector-shaped, convex outwardly curved surface wall, a circle sector-shaped, concave inwardly curved surface wall, a first end face wall pointing in the circumferential direction in a direction of rotation of said permanent-magnet rotor, and a second end face wall pointing in the circumferential direction against said direction of rotation of said permanent-magnet rotor;
said first end face wall and said second end face wall each lying in a plane around the axial line of symmetry forming an axis of rotation of said permanent-magnet rotor; and
said planes being disposed about an obliquely running rotated angle perpendicular to the axial line of symmetry.

4. The electric drive motor according to claim 3, wherein said angle is between 1 degree and 20 degrees.

5. The electric drive motor according to claim 3, wherein said angle is at least substantially 12 degrees.

6. The electric drive motor according to claim 1, wherein said tensioning device or said at least one part shell is formed of a ferritic chromium steel.

7. The electric drive motor according to claim 1, wherein each of said permanent magnets has a convex magnetic outer surface facing radially outwards and an opposite concave magnetic inner surface facing radially inwards, and said outwardly curved surface walls of said tensioning device or said part shells rest flush against said concave magnetic inner surface.

8. The electric drive motor according to claim 7, wherein said convex magnetic outer surface of each of said permanent magnets has a longitudinal groove extending in an axial direction.

9. The electric drive motor according to claim 1, wherein each of said permanent magnets has a convex magnetic outer surface facing radially outwards and forming at least a part of said outwardly curved surface wall of said permanent-magnet rotor directly delimiting said annular gap from inside.

10. The electric drive motor according to claim 9, wherein said convex magnetic outer surface of each of said permanent magnets has a longitudinal groove extending in an axial direction.

11. The electric drive motor according to claim 1, wherein each of said permanent magnets has one or more edges provided with a chamfer.

12. A household appliance, dishwasher, washing machine, dryer, extractor hood or household appliance pump, comprising an electric drive motor including:
- a stator having pole shoes and at least one electrically actuatable stator winding having a field;
- a permanent-magnet rotor rotatably and drivably mounted in the field of said stator winding and defining an annular gap between said rotor and said stator, said rotor having a tensioning device;
- a motor shaft;
- an injection-molded magnet carrier disposed on said motor shaft, said magnet carrier having a circumference and an injection mold with a cavity defining an inner wall; and
- a plurality of separate permanent magnets disposed on said magnet carrier and distributed over said circumference of said magnet carrier, said plurality of permanent magnets being pushed in radial directions outwardly against said inner wall by said tensioning device during injection molding of said magnet carrier;
- said tensioning device including at least two part shells being assembled together in the circumferential direction and complementing each other to form a two-part or multi-part annular body forming an outwardly curved surface wall against which said plurality of permanent magnets rest flush;
- said at least two part shells being adjusting wedges each having an angled surface resting against one another, at least one of said adjusting wedges configured to be axially shifted along said angled surfaces to increase a diameter of said tensioning device for pressing said plurality of permanent magnets outwards in radial directions against said inner wall of said cavity of said injection mold of said magnet carrier during an axial adjustment of at least one of said at least two part shells.

13. A method for producing an electric drive motor, the method comprising the following steps:
- injection-molding a magnet carrier in an injection mold having a cavity defining an inner wall;
- distributing a plurality of separate permanent magnets over a circumference of the magnet carrier;
- using a tensioning device of a permanent-magnet rotor to push the plurality of permanent magnets in radial directions outwardly against the inner wall during the injection molding of the magnet carrier, the tensioning device including at least two part shells being assembled together in the circumferential direction and complementing each other to form a two-part or multi-part annular body forming an outwardly curved surface wall against which the plurality of permanent magnets rest flush, the at least two part shells being adjusting wedges each having an angled surface resting against one another;
- placing the magnet carrier on a motor shaft;
- providing a stator having pole shoes and at least one electrically actuatable stator winding having a field; and
- rotatably and drivably mounting the permanent-magnet rotor in the field of the stator winding and defining an annular gap between the rotor and the stator;
- axially adjusting the at least two part shells relative to one another by axially shifting at least one of the adjusting wedges along the angled surfaces, causing the at least two part shells to be moved outwards in radial directions to increase a diameter of the tensioning device and press the plurality of permanent magnets outwards in radial directions against the inner wall of the cavity of the injection mold of the magnet carrier during an axial adjustment of at least one of the at least two part shells.

* * * * *